(12) United States Patent
Cain et al.

(10) Patent No.: US 11,714,858 B2
(45) Date of Patent: Aug. 1, 2023

(54) METHODS AND SYSTEMS FOR PROVIDING FILE DATA FROM A FILE SYSTEM

(75) Inventors: James Westland Cain, Newbury (GB); Simon Darryl Rogers, Newbury (GB); Michael James Weaver, Newbury (GB)

(73) Assignee: GRASS VALLEY LIMITED, Berkshire (GB)

( * ) Notice: Subject to any disclaimer, the term of this patent is extended or adjusted under 35 U.S.C. 154(b) by 0 days.

(21) Appl. No.: 14/110,227

(22) PCT Filed: Mar. 20, 2012

(86) PCT No.: PCT/GB2012/050602
§ 371 (c)(1),
(2), (4) Date: Dec. 17, 2013

(87) PCT Pub. No.: WO2012/136977
PCT Pub. Date: Oct. 11, 2012

(65) Prior Publication Data
US 2014/0122545 A1 May 1, 2014

(30) Foreign Application Priority Data
Apr. 7, 2011 (GB) .................................. 1105976

(51) Int. Cl.
*G06F 16/16* (2019.01)
*G06F 16/11* (2019.01)
(Continued)

(52) U.S. Cl.
CPC ............ *G06F 16/164* (2019.01); *G06F 16/11* (2019.01); *G06F 16/16* (2019.01); *G06F 16/188* (2019.01); *G06F 16/907* (2019.01)

(58) Field of Classification Search
CPC .......... G06F 17/3007; G06F 17/30115; G06F 17/30233; G06F 16/16; G06F 16/164; G06F 16/166; G06F 16/907
See application file for complete search history.

(56) References Cited

U.S. PATENT DOCUMENTS

| 4,276,544 | A | | 6/1981 | Iinuma | |
|---|---|---|---|---|---|
| 5,864,870 | A | * | 1/1999 | Guck | G06F 16/289 707/E17.006 |

(Continued)

FOREIGN PATENT DOCUMENTS

| EP | 1026872 | 8/2000 |
|---|---|---|
| EP | 1400973 | 3/2004 |

(Continued)

OTHER PUBLICATIONS

UK Intellectual Property Office, "Search Report from GB Application No. 1113621.5 dated Nov. 29, 2011", dated Nov. 29, 2011, pp. 1, Published in: GB.

(Continued)

*Primary Examiner* — Pierre M Vital
*Assistant Examiner* — Jedidiah P Ferrer
(74) *Attorney, Agent, or Firm* — ArentFox Schiff LLP (57) ABSTRACT

A method of providing file data from a file system comprising a data store and a file record database. The method comprises the steps of receiving a request to open a file in the file system and determining the desired properties of the file using the syntax of the request. A file record is then created in the file record database based on the determined properties of the file, and a file handle for the file record is returned. Data constituting the requested file from data in the data store is generated based on the determined properties of (Continued)

the file, and in response to a request to read a portion of data from the file, a corresponding portion of the generated data is returned.

21 Claims, 6 Drawing Sheets

(51) Int. Cl.
*G06F 16/188* (2019.01)
*G06F 16/907* (2019.01)

(56) References Cited

U.S. PATENT DOCUMENTS

| | | | | |
|---|---|---|---|---|
| 6,029,160 | A * | 2/2000 | Cabrera | G06F 17/30067 |
| 6,411,970 | B1 | 6/2002 | Aitken et al. | |
| 6,477,544 | B1 | 11/2002 | Bolosky et al. | |
| 7,194,506 | B1 * | 3/2007 | White | G06F 16/9574 709/203 |
| 7,870,224 | B1 | 1/2011 | Maigatter | |
| 7,913,164 | B1 | 3/2011 | Svendsen | |
| 8,639,734 | B1 * | 1/2014 | Cook | G06F 17/30115 707/829 |
| 8,769,685 | B1 * | 7/2014 | Conrad | G06F 21/562 726/25 |
| 9,307,025 | B1 * | 4/2016 | Kini | G06F 17/30067 |
| 2003/0113038 | A1 * | 6/2003 | Spencer | G06F 16/972 382/305 |
| 2004/0006693 | A1 * | 1/2004 | Vasnani | H04L 63/10 713/168 |
| 2004/0061905 | A1 | 4/2004 | Ohara | |
| 2005/0041606 | A1 | 2/2005 | Hori et al. | |
| 2005/0210083 | A1 | 9/2005 | Kodama | |
| 2006/0056455 | A1 | 3/2006 | Floriach et al. | |
| 2006/0224760 | A1 | 10/2006 | Yu et al. | |
| 2006/0242164 | A1 * | 10/2006 | Evans | G06F 16/168 707/999.1 |
| 2006/0269147 | A1 | 11/2006 | Shen et al. | |
| 2007/0088665 | A1 * | 4/2007 | Sakoh | G06F 16/9574 707/999.001 |
| 2007/0162568 | A1 * | 7/2007 | Gupta | G06Q 30/0242 709/219 |
| 2008/0010325 | A1 * | 1/2008 | Yamakawa | G06F 16/185 707/999.204 |
| 2008/0209014 | A1 * | 8/2008 | Anderson | H04N 1/32128 707/E17.009 |
| 2008/0307128 | A1 | 12/2008 | Amron et al. | |
| 2009/0006634 | A1 * | 1/2009 | Parsell | G06F 17/30893 709/228 |
| 2009/0100496 | A1 | 4/2009 | Bechtolsheim et al. | |
| 2010/0082740 | A1 | 4/2010 | Tsubaki | |
| 2010/0161825 | A1 | 6/2010 | Ronca et al. | |
| 2010/0195558 | A1 | 8/2010 | Koskinen | |
| 2010/0235542 | A1 | 9/2010 | Visharam et al. | |
| 2010/0322302 | A1 | 12/2010 | Rodriguez et al. | |
| 2010/0325086 | A1 * | 12/2010 | Skinner | G06F 16/9577 707/609 |
| 2011/0082945 | A1 | 4/2011 | Myers et al. | |
| 2011/0087727 | A1 * | 4/2011 | Takakura | G06F 17/30274 709/203 |
| 2011/0099594 | A1 | 4/2011 | Chen et al. | |
| 2011/0126104 | A1 * | 5/2011 | Woods | G11B 27/32 715/719 |
| 2011/0202674 | A1 | 8/2011 | Su et al. | |
| 2011/0242123 | A1 * | 10/2011 | Momosaki | G06F 17/30056 345/581 |
| 2011/0314095 | A1 | 12/2011 | Gupta et al. | |
| 2012/0023155 | A1 | 1/2012 | Myers et al. | |
| 2012/0254456 | A1 | 10/2012 | Visharam et al. | |
| 2014/0237077 | A1 | 8/2014 | Cain et al. | |
| 2014/0289257 | A1 | 9/2014 | Cain et al. | |

FOREIGN PATENT DOCUMENTS

| | | |
|---|---|---|
| GB | 2446832 | 8/2008 |
| GB | 2489932 | 10/2012 |
| GB | 2495268 | 4/2013 |
| WO | 0014632 | 3/2000 |
| WO | 2004090791 | 10/2004 |
| WO | 2006087676 | 8/2006 |
| WO | 2007025029 | 3/2007 |
| WO | 2008102159 A1 | 8/2008 |
| WO | 2011093629 | 8/2011 |
| WO | 2012136977 | 10/2012 |
| WO | 2013021168 | 2/2013 |

OTHER PUBLICATIONS

European Patent Office, "International Search Report from PCT Application No. PCT/GB2012/051808 dated Jun. 11, 2012", dated Jun. 11, 2012, Published in: EP.
UK Intellectual Property Office, "Search Report from GB Application No. 1114628.9 dated Dec. 1, 2011", dated Dec. 1, 2011, Published in: GB.
European Patent Office, "International Search Report from PCT Application No. PCT/GB2012/051807 dated Jun. 11, 2012", dated Jun. 11, 2012, Published in: WO.
GB Intellectual Property Office, "GB Search Report", "from GB Patent Application No. GB1105976.3", dated Aug. 15, 2011, Published in: GB.
European Patent Office, "International Search Report", "from PCT Application No. PCT/GB2012/050602", dated Apr. 26, 2013, pp. 1, Published in: WO.
Vetro et al., "Media Conversions to Support Mobile Users", "Canadian Conference on Electrical and Computer Engineering May 13-16, 2001", May 13, 2001, pp. 607-612, vol. 1, Publisher: IEEE, Published in: US.
United States Patent and Trademark Office, "Final Office Action", "from U.S. Appl. No. 14/236,844", dated Mar. 9, 2017, pp. 1-27, Published in: US.
United States Patent and Trademark Office, "Office Action", "from U.S. Appl. No. 14/236,842", dated Nov. 1, 2016, pp. 1-42, Published in: US.
U.S. Patent and Trademark Office, "Office Action", "from U.S. Appl. No. 14/236,844", dated Apr. 20, 2016, pp. 1-32, Published in: US.
United States Patent and Trademark Office, "Final Office Action", "From U.S. Appl. No. 14/236,842", dated May 8, 2017, pp. 1-13, Published in: US.
United States Patent and Trademark Office, "Notice of Allowance", "From U.S. Appl. No. 14/236,842", dated Jul. 20, 2017, pp. 1-5, Published in: US.
Office Action dated Mar. 1, 2019 from corresponding GB Application No. 1105976.3.
United States Patent and Trademark Office, "Notice of Allowance for U.S. Appl. No. 14/236,842", dated Nov. 22, 2017, pp. 1-10, Published in: US.
Office Action dated Oct. 4, 2018 from corresponding EP Application No. 127194306.6-1222.
S. Shepler et al: "RFC 3530—Network File System (NFS) version 4 Protocol"; Apr. 1, 2003 (Apr. 1, 2003), XP055021233; Retrieved from the Internet: URL:http://rsync.tools.ietf.org/html/rfc3530 [retrieved on Mar. 7, 2012].
United States Patent and Trademark Office, "Notice of Allowance for U.S. Appl. No. 14/236,842", dated Mar. 13, 2018, pp. 1-9, Published in: US.
Examination Report under Section 18(3) received in GB Patent Application No. 1105976.3 dated Dec. 4, 2019.
Communication pursuant to Article 94(3) received in EP Patent Application No. 12719430.6 dated Nov. 5, 2019.
Salzman et al., "The Linux Kernel Module Programming Guide," May 18, 2007.

* cited by examiner

METHODS AND SYSTEMS FOR PROVIDING FILE DATA FROM A FILE SYSTEM

FIELD OF THE INVENTION

The present invention concerns an improved file system. More particularly, but not exclusively, the invention concerns a file system gateway and a method of providing file data from a file system, which allow files to be created only as and when explicitly required. The invention is particularly, but not exclusively, suitable for file systems containing essence data that constitutes media files.

BACKGROUND OF THE INVENTION

Figure 1:
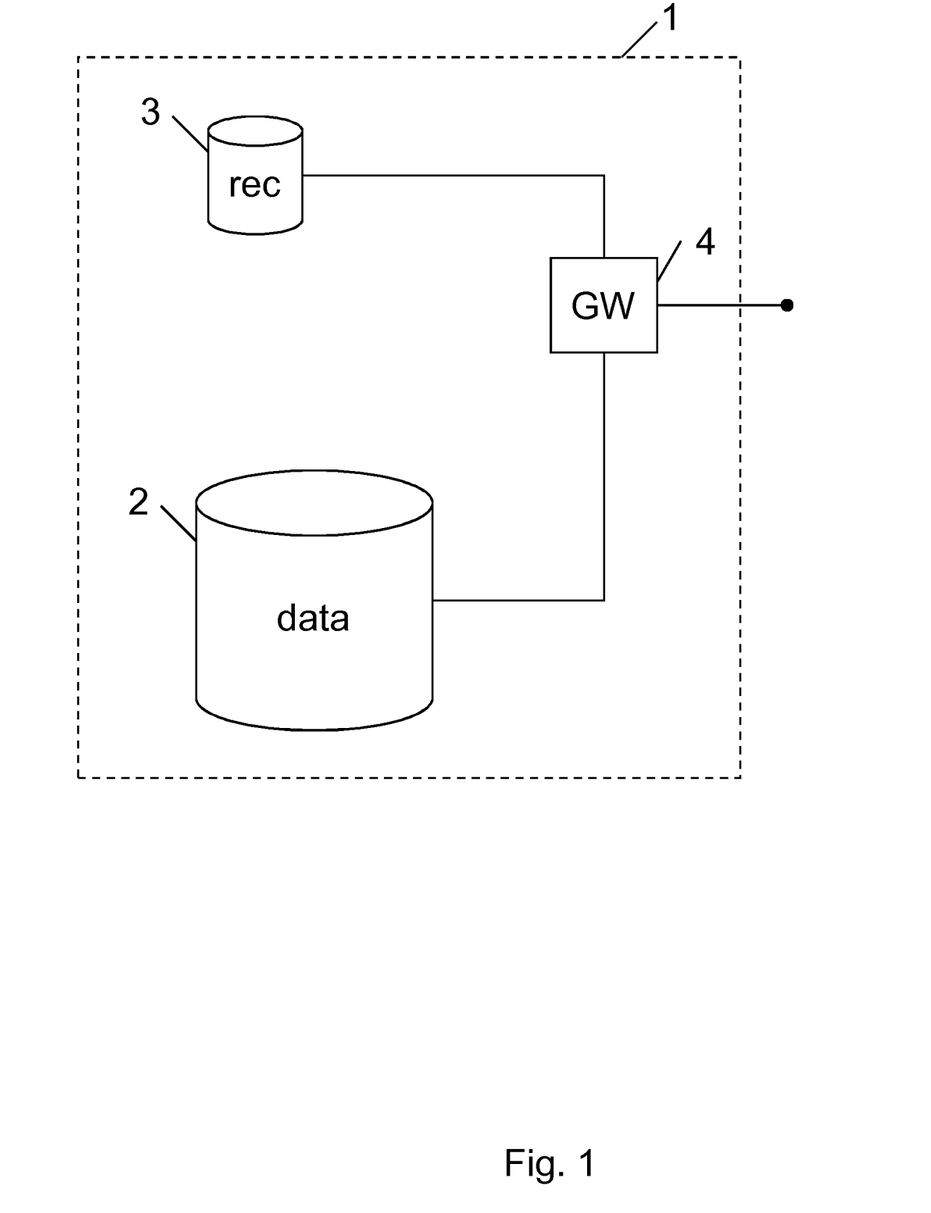
FIG. 1 is a schematic diagram of a conventional file system.

A conventional file system is shown in FIG. 1. The file system 1 comprises a data store 2, which stores the data that constitutes the files stored in the file system 1. (A particular set of data in the data store 2 may also include an identification tag such as a globally unique identifier or "GUID".) The file system 1 further comprises a file record database 3, which contains file records that store the details of the files stored in the file system 1, in particular the location of the data in the data store 2 that constitutes the files, but also other metadata such as creation date, file length, permission information and other attributes.

Access to the file system 1 is provided by a file system gateway 4, which accepts requests to read/write files from the file system 1, for example, and in response reads/writes data to/from the data store 2 based on the file records in the file record database 3; similarly, the file system gateway 4 accepts requests to read/write to the file records in the file record database 3 itself. The file system gateway 3 may be connected directly to a device such as a personal computer or server; alternatively the device may communicate with other devices over a network, as a file server or network-attached storage (NAS) device. Such a network may be a local area network (LAN) or a public network such as the Internet.

The file system gateway 4 will communicate using a file protocol, for example the SMB2 protocol (developed by Microsoft, and defined at msdn.microsoft.com/en-us/library/cc246482(v=prot.13).aspx). The SMB2 protocol includes the following types of request, amongst others (each is in practice a group of commands, for example the group DIR contains the commands QUERY DIRECTORY and CHANGE NOTIFY):

DIR—returns a list of files and folders in a particular directory;

CREATE/OPEN—opens a file, creating and returning a file handle (or file identifier, "FID"), a temporary identifier used to refer to the file;

READ—reads data constituting the file;

WRITE—writes data to the file;

CLOSE—closes the file, retiring the FID.

The file system 1 may for example be a media file store, in which case the data store 2 stores media data, in other words video and audio data, conventionally known as "essence" data. A file in the file system 1 may be made up of a single set of data from the data store 2 with a single GUID, as is conventionally the case. A file may also be a "clip"; in this case, the file is made up of portions of data from one or more sets of data in data store 2, with the details of how the clip is constructed being part of the details of the file stored in the file record in the file record database 3. Clips are generally created by manual editing of files already present in the file system 1.

It can be desirable to have a particular clip available in several different versions, for example different file formats, sample rates and/or image sizes. However, a large amount of space is required to store the different version files, and the creation of the version files may require the processing of the essence data making up the original clip, which can be time consuming. In order to mitigate this, "virtual" file systems have been proposed.

WO 2008/8159 A1 (Quantel Limited) published 28 Aug. 2008 describes such a virtual file system. The file system described therein when queried indicates that it has several different version files available. However, the different version files are not in fact explicitly stored in the file system, but instead the contents of the version files are created only as and when requested.

WO 00/14632 A1 (Metaphorics, LLC) published 16 Mar. 2000 describes another virtual file system, in which similarly the contents of a requested file is generated only as and when requested.

Such virtual file systems are thus able to provide several different version files while avoiding the problems of the required storage space and time taken to create in advance all versions that may be requested. However, which versions are to be provided must be set in advance, as this determines the version files that the file system indicates are present when queried.

The present invention seeks to mitigate the above-mentioned problem. Alternatively and/or additionally, the present invention seeks to provide an improved, more flexible virtual file system.

SUMMARY OF THE INVENTION

In accordance with a first aspect of the present invention there is provided a method of providing file data from a file system comprising a data store and a file record database, the method comprising the steps of:

receiving a request to open a file in the file system;

determining the desired properties of the file using the syntax of the request;

creating a file record in the file record database based on the determined properties of the file;

returning a file handle for the file record;

generating data constituting the requested file from data in the data store, based on the determined properties of the file;

in response to a request to read a portion of data from the file, returning a corresponding portion of the generated data.

With this method, files are created only when a request to open them is received; the files thus do not need to be created in advance (and never need to be created if they are never requested), but nevertheless appear to already exist to the system making the request. This means that by using an appropriate scheme for determining the desired properties of the file from the syntax of the request, a near-limitless range of files can provided on demand. For example, a file system for providing image files in different sizes could be providing using a scheme in which the height of the file in pixels was provided as a numeral in the filename, allowing image files of any corresponding size to be provided. Another advantage is that the method can be transparent to the system making the request, as to the system it will appear that the files already exist, allowing the method to be used with existing systems as long as the desired properties of the files they request can be determined from the syntax of the requests they make.

Preferably, the portion of data constituting the file is generated only when requested. This avoids data being generated which is never required, which is inefficient. However, alternatively all data constituting a file may be generated when the file record is initially created.

Preferably, the filename of the requested file determines an existing file in the file system containing the data from which the data in the file is generated. Preferably again, the extension of the requested file determines the file format of the requested file. These provide convenient methods for the content and file format of the requested file to be indicated in the request. Advantageously, the hierarchy of directories in which the requested file is located determines properties of the requested file. Further advantageously, each directory in the hierarchy determines a respective property of the file. This provides a convenient structured method for multiple desired properties of the requested file to be indicated in the request.

Advantageously, the syntax of the request is used to generate a database query for querying a database, and the desired properties of the file are determined using the results of the database query. The query may, for example, be generated from the hierarchy of directories in which the requested file is located. The query may return a result which is then formatted using the filename and/or extension of the requested file.

In accordance with a second aspect of the present invention there is provided a file system gateway for a file system comprising a data store and a file record database, wherein the file system gateway is arranged:

in response to a request to open a file in the file system, to determine the desired properties of the file using the syntax of the request, create a file record in the file record database based on the determined properties of the file, and return a file handle for the file record;

and wherein the file system gateway is further arranged to generate data constituting the file from data in the data store based on the determined properties of the file, and in response to a request to read a portion of data from the file to return a corresponding portion of the generated data.

Preferably, the portion of data constituting the file is generated only when requested.

Preferably, the filename of the requested file determines an existing file in the file system containing the data from which the data in the file is generated. Preferably again, the extension of the requested file determines the file format of the requested file. Advantageously, the hierarchy of directories in which the requested file is located determines properties of the requested file. Further advantageously, each directory in the hierarchy determines a respective property of the file.

Advantageously, the file system gateway is arranged to generate a database query for querying a database from the syntax of the request, and wherein the desired properties of the file are determined using the results of the database query.

The file system gateway may comprise the file record database.

In accordance with a third aspect of the present invention there is provided a file system comprising a data store, a file record database, and a file system gateway as described above.

In accordance with a fourth aspect of the present invention there is provided a computer program product arranged, when executed, to perform the steps of any of the methods described above.

In accordance with a fifth aspect of the present invention there is provided a computer program product arranged, when executed on a computing device, to provide a file system gateway as described above.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 2:
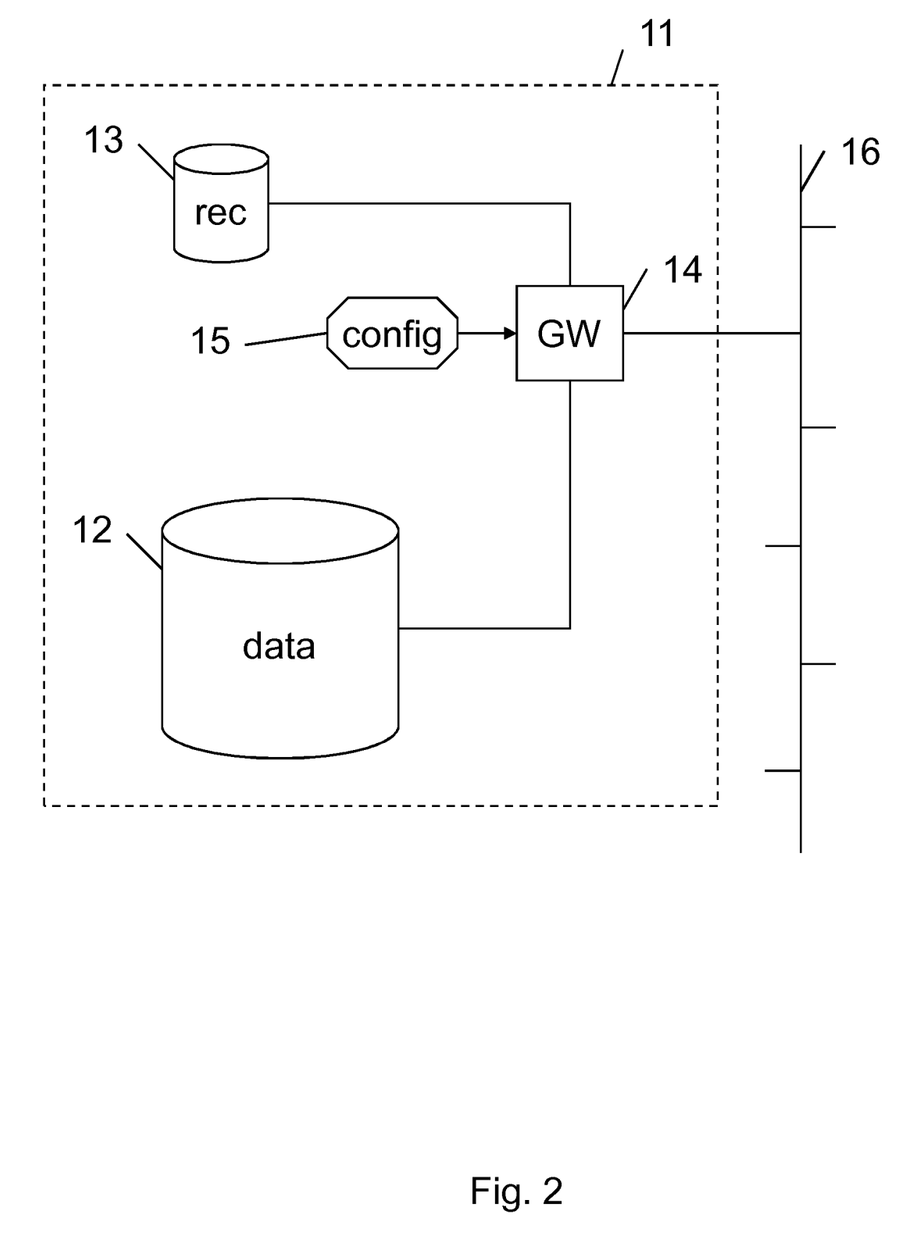
FIG. 2 is a schematic diagram of a networked computer system including a file system in accordance with a first embodiment of the present invention.
Figure 3:
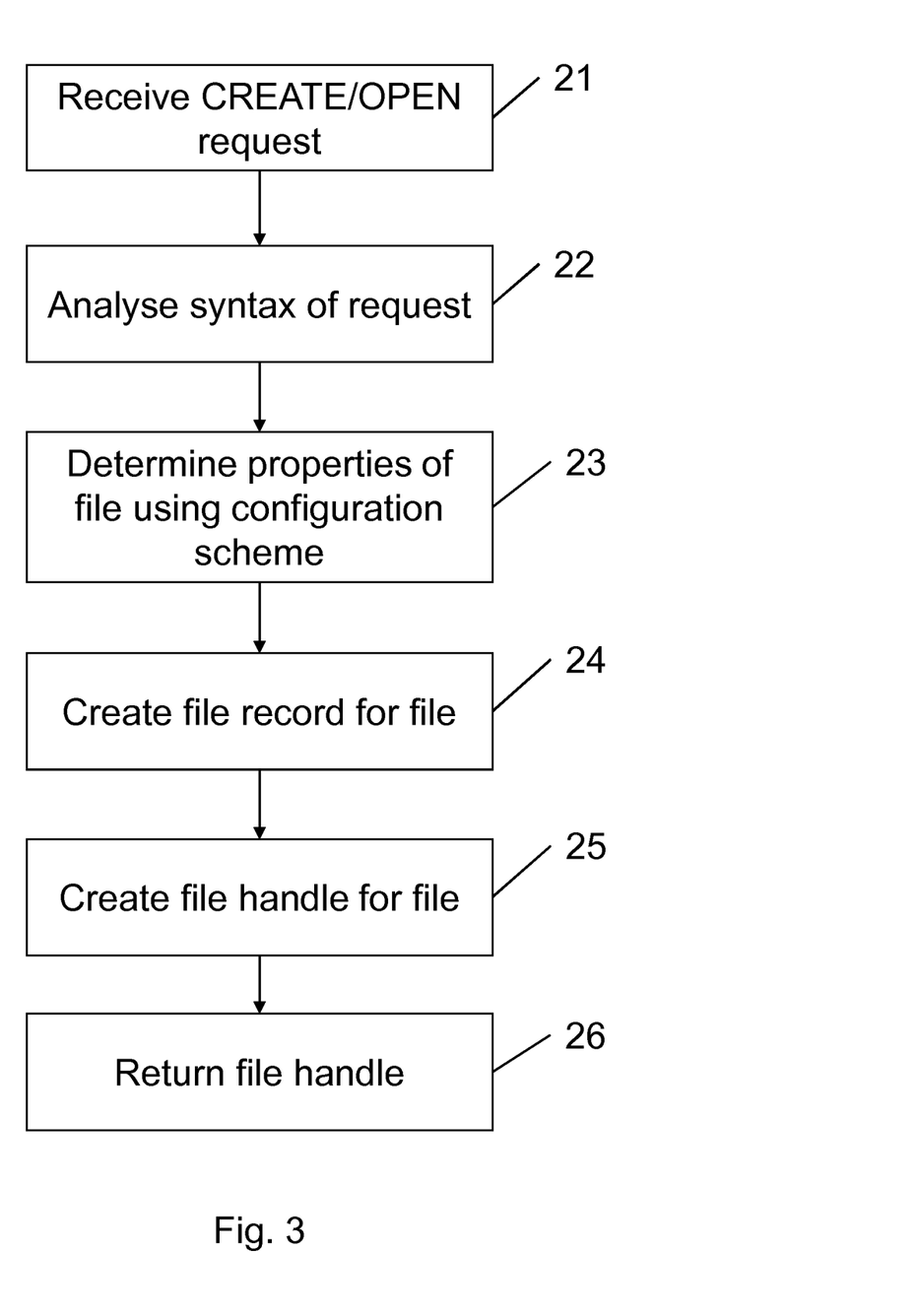
FIG. 3 is a flow chart describing the operation of the file system of a first embodiment in response to a CREATE/OPEN request.
Figure 4:
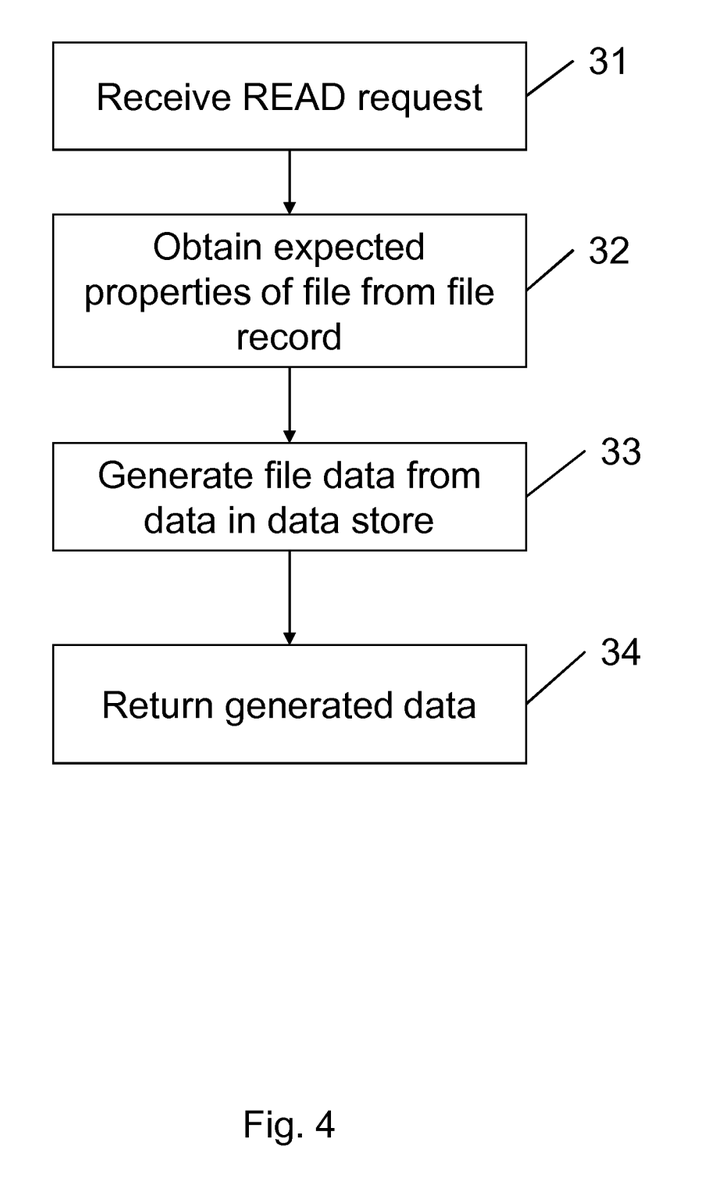
FIG. 4 is a flow chart describing the operation of the file system of a first embodiment in response to a READ request.

A first embodiment of the present invention is now described with reference to FIGS. 2 to 4. FIG. 2 is a schematic diagram of a networked computer system including a file system 11 in accordance with the embodiment. As in a conventional file system, the file system 11 comprises a data store 12 that stores file data, and a file record database 13 that stores the details of files. The data store 12 and file record database 13 may be entirely conventional.

The file system 11 further comprises a file system gateway 14, which provides access to the file system 11 as described below via a network 16. The file system gateway 14 is configured to provide files in accordance to a predetermined configuration scheme 15 (shown schematically in FIG. 1, but in practice the configuration scheme 15 is a particular setup of the file system gateway 14, rather than a distinct entity).

The operation of the file system 11 is now described. The file system gateway 14 communicates with devices on the network 16 in accordance with the SMB2 protocol. In other words, the file system gateway 14 accepts requests defined by the SMB2 protocol, and returns responses of the type and form expected by another system using the SMB2 protocol. However, the file system 11 does not perfectly implement the SMB2 protocol, in the sense that it only simulates a conventional SMB2 file server for certain situations as defined by the configuration scheme 15. The simulation is not perfect, and in particular the behaviour of the file system 11 does not match that defined by the SMB2 protocol in all situations.

The behaviour of the file system gateway 14 in response to the core SMB2 requests given above are as follows.

DIR—as with a conventional SMB2 file system, this returns a list of files and folders in a particular directory.

CREATE/OPEN—the behaviour of the file system gateway 14 in response to a CREATE/OPEN request is described with reference to the flowchart of FIG. 3. First, the CREATE/OPEN request is received (step 21). The CREATE/OPEN request will include a text string defining the location and name of the file to be opened, as a hierarchy of directories followed by a file name, for example "\dir1\dir2\dir3\file.ext", and the syntax of this text string is analysed (step 22). For example, the hierarchy of directories in which the requested file is (expected to be) located, and the expected format of the file as given by the file extension, are extracted. The expected properties of the file are then determined from the configuration provided by the configuration scheme 15 (step 23). Using the determined properties, a suitable file record for the file is created in the file record database 13 (step 24). A file handle for the file is then created (step 25), and returned (step 26).

READ—the behaviour of the file system gateway 14 in response to a READ request is described with reference to the flowchart of FIG. 4. First, the READ request is received (step 31). The READ request will include a file handle, and may specify a particular portion of data from the file using a byte range. The file handle will refer to a file record stored in the file record database 13, and the expected properties of the file are obtained from this file record (step 32). (The expected properties are determined when the file record is created as a result of a CREATE/OPEN request. At that stage, details of those properties may be explicitly stored in the file record. Alternatively, the properties may be recreated from the location and name of the file and the configuration scheme 15.) The data requested is then generated based on those expected properties from the data in the data store 12 (step 33), and returned (step 34). The generated data may be stored in the data store 12 in case it is requested again at a later time, or alternatively may be discarded.

WRITE—if appropriate, the data in the data store 12 is updated as instructed by the WRITE request. However, in embodiments where files of different formats/qualities are created on request, for example, it may not be appropriate to update data that is stored in the data store 12 in a first format/quality based on a WRITE request made to a virtual version of the file in a different format/quality. Consequently, in many cases a WRITE request will have no effect. In some embodiments, writing to newly created files only may be allowed.

CLOSE—as with a conventional SMB2 file system, the file is closed and the file handle retired. The corresponding file record may be deleted, or may be preserved in case the file is requested again at a later time.

Thus, in the present embodiment the CREATE/OPEN request, which is conventionally used to create a file handle for an existing file, in this case causes a file with the expected properties (or its file record, at least) to be created where none previously existed by the file system 11. This can be seen in particular in the responses returned by DIR and CREATE/OPEN requests; a DIR request may initially show that a directory is empty, but nonetheless a CREATE/OPEN request for a file in the same directory may nevertheless successfully return a file handle for the file. A subsequent DIR request will then show that the file is now present in the directory. (In alternative embodiments the file may be hidden from the DIR request, to avoid the possibility of unwanted issues due to changes in the properties of the file, such as "race conditions".) To give a specific example, the file system 11 may contain "real" video files movie1.avi and movie2.avi in format AVI with frame rate 60 frames per second (FPS) and frame size 4000 by 3000 pixels. The file records for these files indicate that the files are located in the directory hierarchy \movies\60\4000\, and give the location of the (actually existing) essence data for the files in the data store 12. SMB2 requests concerning these files will be treated as in a conventional file system, in other words the files can be opened, read from, written to, closed, and so on, in the same way as a file in a conventional SMB2 file system.

However, the configuration scheme 15 gives rules for determining the expected properties of files not already present in the file system 11. For example, the configuration scheme 15 may determine that the following files at the following locations have properties as follows:

\movies\30\4000\movie1.avi—a version of video file movie1.avi in AVI format with frame rate 30 FPS and frame size 4000 by 3000 pixels.

\movies\30\200\movie2.mp4—a version of video file movie2.avi in MPEG4 format with frame rate 30 FPS and frame size 200 by 150 pixels.

\stills\120.00\4000\movie1.bmp—a still from video file movie1.avi at time 120.00 seconds, in bitmap format and size 4000 by 3000 pixels.

\stills\37.43\200\movie2.jpg—a still from video file movie1.avi at time 37.43 seconds, in JPEG format and size 200 by 150 pixels.

In each case it can therefore be seen that a CREATE/OPEN request for a file causes a suitable file record for the file to be created, and a READ request then causes suitable data to be generated from the essence data of the original "real" file. Thus, the file system is able to provide files that are versions of the original video files in different formats/qualities, and similarly stills from the video files in different formats/qualities, on the basis of requests to open the files themselves as if they already existed.

Figure 5:
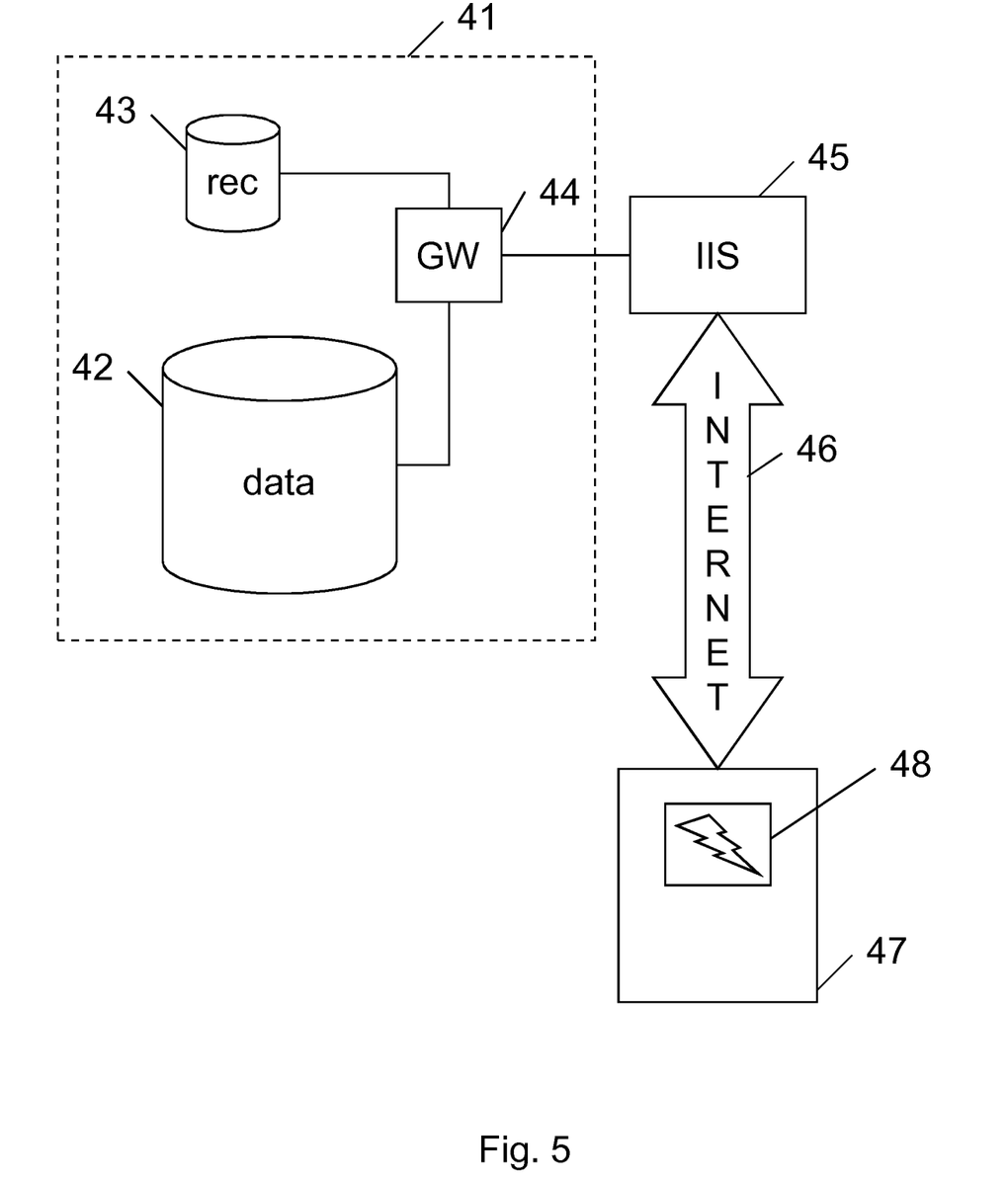
FIG. 5 is a schematic diagram of a networked computer system including a file system in accordance with a second embodiment of the present invention.
Figure 6:
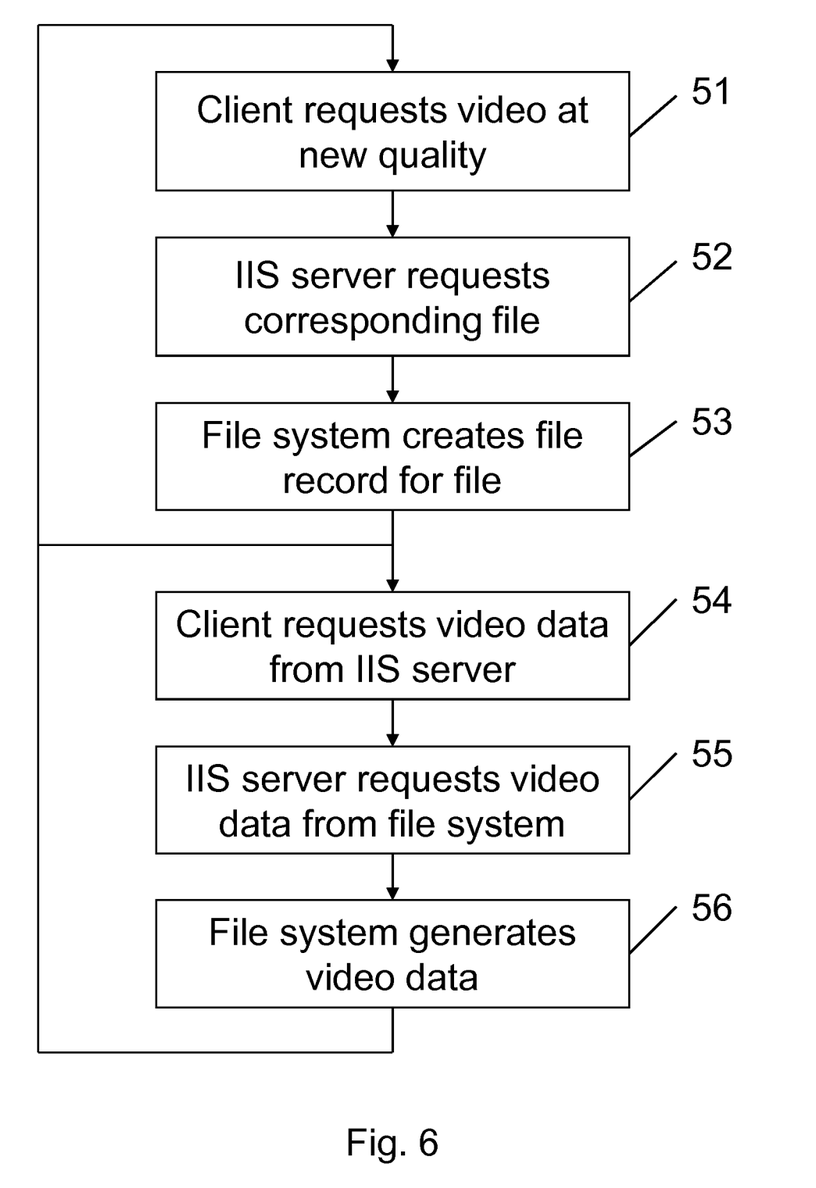
FIG. 6 is a flow chart describing the operation of the file system of a second embodiment.

A second embodiment of the present invention is now described with reference to FIGS. 5 and 6. FIG. 5 is a schematic diagram of a networked computer system including a file system 41 in accordance with the embodiment. As in the preceding embodiment, the file system 41 comprises a conventional data store 42, a file record database 43, and a file system gateway 44.

The file system gateway 44 is in communication with an Internet Information Services (IIS) web server 45 (as developed by Microsoft); in practice a single server may incorporate both the file system 41 and the IIS server application that allows the server to act as an IIS web server. The IIS web server 45 communicates via the Internet 46 with a personal computer 47 running a video streaming client application 48, for example a Silverlight application.

In the present embodiment, the IIS web server streams video using Smooth Streaming, a media service that provides a video at a quality level appropriate to the bandwidth over which the video is streamed. In essence, video is requested by client at the highest quality the bandwidth it has available can support. If fragments of video are not received by the client in time due to lack of bandwidth, the client lowers the quality of the video it requests. Similarly, if the client finds that additional bandwidth is available, it increases the quality of the video it requests.

In order to provide the differing qualities of video, the IIS web server 45 requires that files are available providing versions of the video being streamed in all the quality levels it may require. The files are in ISMV format, which is a format that contains locatable fragments of MPEG4-format video, for example 2 second fragments. This allows the IIS server to change the file from which the video is being streamed, so changing the quality at which the video is streamed, as it is able to locate the next fragment to stream within the new file. The files are provided in a directory such as \streams\ID\, with the filenames of the files indicating the quality of the video data in the file.

The behaviour of the system is now described with reference to the flowchart of FIG. 6. The file system 41 contains a "real" base file of the video at the highest available quality. Initially, the video streaming client 48 requests video data of a particular quality from the IIS web server 45 (step 51). This in turn causes the IIS web server 45 to request to open the corresponding file in the file system 41 (step 52). The file system gateway 44 creates a new file record for a file with the required properties in the file record database 43 (step 53). As the client 48 requests video data from the IIS web server 45 (step 54), the IIS web server 45 in turn requests video data from the file system 41 (step 55), and this is generated by the file system 41 with the required properties from the data for the "real" base video file. The generated data is then returned to the IIS web server 45 and then to the client 48.

Steps 54 to 56 are repeated as long as video data of the same quality is required. If, however, the client requests video data of a different quality, the process returns to step 51 to create a new file with the desired properties.

Thus, in this embodiment the file system 41 is configured to create files and generates and returns video data based on the filename of the file; in other words, the configuration scheme of the file system 41 is defined so that the behaviour of the file system 41 in response to requests from the IIS web server 45 is as required by the IIS web server 45.

While the present invention has been described with reference to particular embodiments, it will be appreciated by those of ordinary skill in the art that the invention lends itself to many different variations not specifically described herein. For example, while the embodiments given herein describe file systems that (appear to) implement the SMB2 file system protocol, the invention could equally be used with other file system protocols. Further, while the invention is particularly applicable to file systems storing media files, it is applicable to any file system used to provide files in different formats/qualities, for example text files that may be provided in different formats such as Unicode, HTML and proprietary word processer formats. It will particularly be appreciated that file systems in accordance with the invention can be used to provide files for systems (such as applications, distributed software system or hardware systems) with differing requirements, by for any particular system defining an appropriate configuration scheme that cause the file system to behave as required by that systems in question in the circumstances that will arise during the use of that system.

The invention claimed is:

1. A method of providing file data from a file system comprising a data store that includes an existing file having set file properties and a file record database, the method comprising:
receiving a request to open a requested file that does not exist in the file system, wherein the request to open the requested file includes a text string that defines a location and name in the file record database of the requested file to be open;
determining the desired properties of the requested file using a syntax of the text string of the request that defines a format and a quality of essence data of the desired properties for the requested file that is not set in advance as being available by the file system;
creating a file record in the file record database that stores the determined and desired properties of the requested file without creating and storing the essence data having the determined and desired properties;
returning a file handle that refers to the created file record in the file record database;
in response to a request to read only a portion of essence data of the requested file based on a byte range of the file and with the request including the file handle, referring by the file handle to the created file record to obtain the desired properties including the defined format and quality and generating the essence data from the existing file in the data store to have the defined format and quality that does not exist in the file system before the request to read the portion of the essence data; and
returning a corresponding portion of the generated essence data with the desired format and quality.

2. A method as claimed in claim 1, wherein a filename included in the request to open the file determines the existing file in the file system containing the essence data in the data store from which the essence data in the requested file is generated.

3. A method as claimed in claim 1, wherein an extension of the requested file determines the format of the requested file.

4. A method as claimed in claim 1, wherein the syntax corresponds to a hierarchy of directories, and wherein each level in the hierarchy indicates a desired property of the requested file.

5. A method as claimed in claim 4, wherein each level in the hierarchy corresponds to a directory.

6. A method as claimed in claim 1, wherein the syntax of the request to open the requested file is used to generate a database query for querying the file record database, and the desired properties of the requested file are determined using the results of the database query.

7. The method of claim 1, wherein the request to read the portion of essence data from the requested file comprises the file handle.

8. The method of claim 1, wherein the requested file comprises audio or video essence data having a total duration.

9. The method of claim 8, wherein the requested portion of the requested file has a duration that is less than the total duration.

10. The method of claim 1, wherein the desired properties of the requested file include at least one of:
frame rate;
pixel length;
pixel height;
image quality; or
resolution.

11. The method of claim 10, wherein, in response to said request to read a portion of essence data from the requested file, the generated data is generated dynamically to have at least one of said desired properties.

12. A hardware system comprising a hardware server configured to implement a file system comprising a file system gateway, a data store that includes an existing file having set file properties, and a file record database, wherein the file system gateway is configured:
in response to a request to open a requested file that does not exist in the file system with the request to open the requested file including a text string that defines a location and name in the file record database of the requested file to be open, to determine the desired properties of the requested file using a syntax of the text string of the request that defines a format and a quality of essence data of the desired properties for the requested file that is not set in advance as being available by the file system, create a file record in the file record database that stores the determined and desired properties of the file without creating and storing the essence data having the determined and desired properties, and return a file handle that refers to the created file record in the file record database; and wherein, in response to a request to read only a portion of essence data of the requested file based on a byte range of the file and with the request including the file handle, referring by the file handle to the created file record to obtain the desired properties including the defined format and quality and wherein the file system gateway is further configured to generate the essence data from the existing file in the data store to have the defined format and quality that does not exist in the file system before the request to read the portion of the essence data, and to return a corresponding portion of the generated essence data with the desired format and quality.

13. A hardware system comprising a hardware server as claimed in claim 12, wherein the filename of the requested file determines the existing file in the file system containing the essence data from which the essence data in the requested file is generated.

14. A hardware system comprising a hardware server as claimed in claim 12, wherein the extension of the requested file determines the format of the requested file.

15. A hardware system comprising a hardware server as claimed in claim 12, wherein the syntax corresponds to a hierarchy of directories, and wherein each level in the hierarchy indicates a desired property of the requested file.

16. A hardware system comprising a hardware server as claimed in 15, wherein each level in the hierarchy corresponds to a directory.

17. A hardware system comprising a hardware server as claimed in claim 12, wherein the file system gateway is further configured to generate a database query for querying a database from the syntax of the request to open the requested file, and wherein the desired properties of the requested file are determined using the results of the database query.

18. A hardware system comprising a hardware server as claimed in claim 12, wherein the file system gateway comprises the file record database.

19. A tangible, non-transitory computer program product storing instructions arranged, when executed, to:

receive a request to open a requested file that does not exist in the file system, wherein the request to open the requested file includes a text string that defines a location and name in the file record database of the requested file to be open;

determine the desired properties of the requested file using a syntax of the text string of the request that defines a format and a quality of essence data of the desired properties for the requested file that is not set in advance as being available by the file system;

create a file record in the file record database that stores using the determined and desired properties of the requested file without creating and storing the essence data having the determined and desired properties;

return a file handle that refers to the created file record in the file record database;

in response to a request to read only a portion of essence data of the requested file based on a byte range of the file and with the request including the file handle, refer by the file handle to the created file record to obtain the desired properties including the defined format and quality;

generate the essence data from the existing file in the data store to have the defined format and quality that does not exist in the file system before the request to read the portion of the essence data; and return a corresponding portion of the generated essence data with the desired format and quality.

20. A computer program product as claimed in claim 19, wherein a filename included in the request to open the requested file determines the existing file in the file system containing the data in the data store from which the essence data in the requested file is generated.

21. A computer program product as claimed in claim 19, wherein an extension of the requested file determines the format of the requested file.

* * * * *